June 23, 1953  C. HETTINGER  2,642,833
MACHINE FOR APPLYING SEEDS TO DOUGH FORMS
Filed Oct. 20, 1950  2 Sheets-Sheet 1

INVENTOR.
CHARLES HETTINGER
BY Jones & Roe
ATTORNEYS

June 23, 1953  C. HETTINGER  2,642,833
MACHINE FOR APPLYING SEEDS TO DOUGH FORMS
Filed Oct. 20, 1950  2 Sheets-Sheet 2

INVENTOR.
CHARLES HETTINGER
BY
ATTORNEYS

Patented June 23, 1953

2,642,833

UNITED STATES PATENT OFFICE 2,642,833

MACHINE FOR APPLYING SEEDS TO DOUGH FORMS

Charles Hettinger, West Englewood, N. J.

Application October 20, 1950, Serial No. 191,262

2 Claims. (Cl. 118—16)

This invention involves a novel apparatus for mechanically applying seeds or other fine solids to dough forms prior to baking.

In carrying out the invention, I have devised a main frame which supports a pair of receptacles— one directly in advance of the other. One receptacle contains a suitable moistening agent and a conveyor partially submerged in the moistening agent. The other receptacle, by way of example, contains poppy seeds, and is likewise equipped with a conveyor which carries the seeds above the top of the receptacle. Dough forms are fed to the first conveyor which moistens the bottoms of the forms. Then the forms are transferred to the second conveyor, and due to the moist condition of the forms, the seeds presented by said conveyor adhere to the forms, and in this condition the latter are passed on to the oven, and baked.

For the purpose of illustrating my invention, I have shown in the accompanying drawings one structural embodiment thereof which is at present preferred by me.

Figure 1:
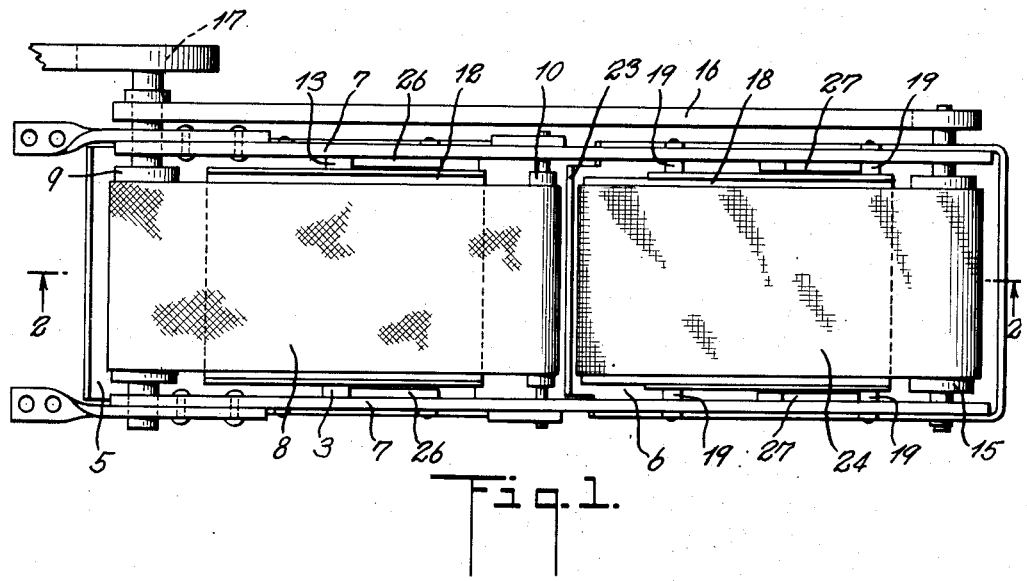
Fig. 1 is a top plan view of the complete machine.

Essentially, the invention comprises a pair of semi-circular receptacles 5—6 suitably supported and depending from a rectangular frame 7. Operating within receptacle 5 is a conveyor belt 8, preferably made of canvas or similar material having a definite characteristic of capillary attraction, and trained over drive roll 9 and guide rolls 10—11 in a form simulating an inverted right-angled triangle. The belt further transverses a bed 12 which is sustained by brackets 13, connected to frame 7 and extends transversely of receptacle 5 and medially of the belt set-up.

Figure 2:
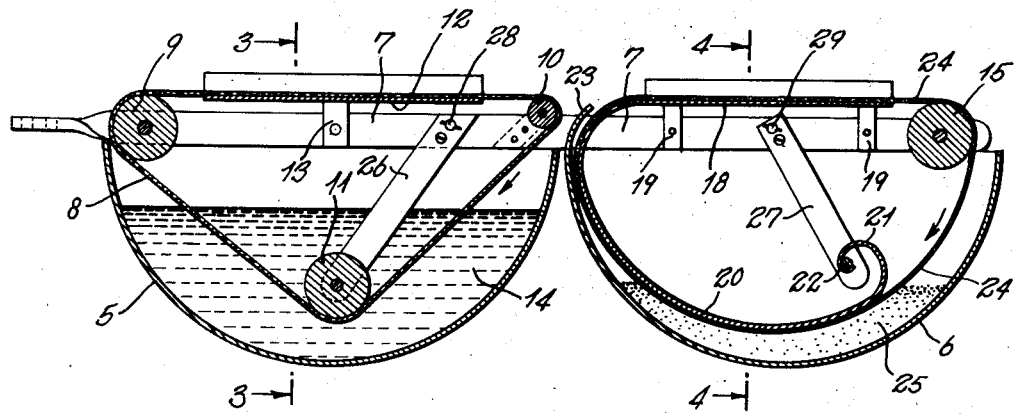
Fig. 2 is a longitudinal section along lines 2—2 of Fig. 1.
Figure 3:
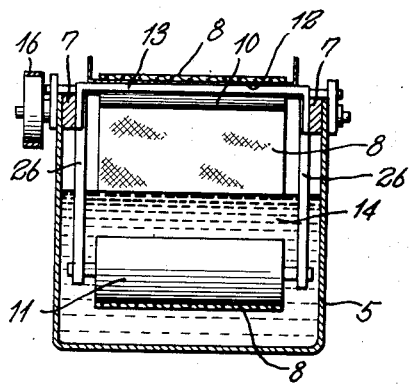
Fig. 3 is a transverse section taken on lines 3—3 of Fig. 2.
Figure 4:
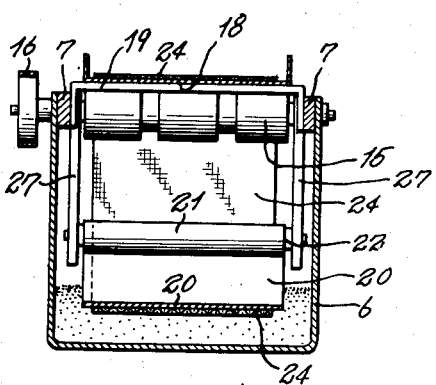
Fig. 4 is a transverse section along lines 4—4 of Fig. 2.
Figure 5:
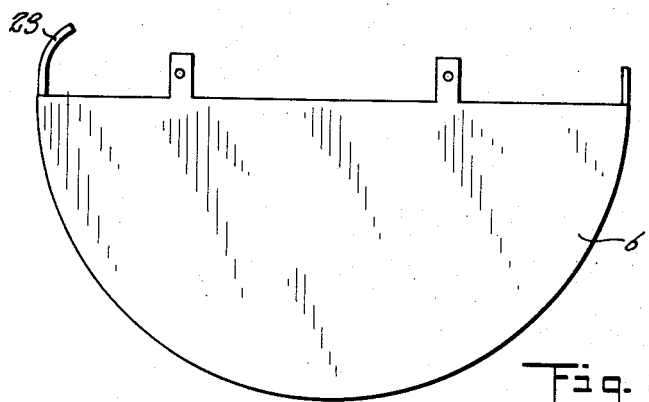
Fig. 5 is a detailed view of the receptacle designed to contain seeds.
Figure 6:
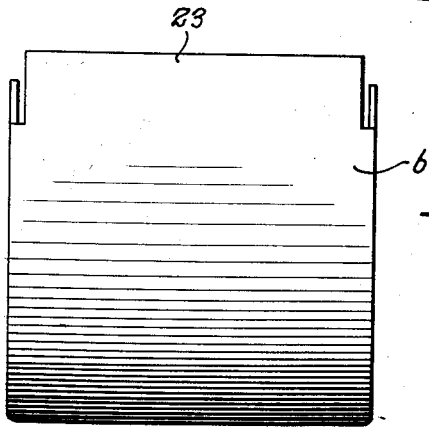
Fig. 6 is an end view of the receptacle.

As clearly shown in Fig. 2, receptacle 5 is designed to be partially filled with water 14, and a portion of belt 8 is submerged therein.

Receptacle 6 is of similar conformation with respect to receptacle 5, and lies directly forward thereof. At its outer upper end, receptacle 6 is provided with a drive roll 15 connected by belt 16 to drive roll 9, which latter is connected to driven pulley 17. Receptacle 6 is also equipped with a bed 18, supported relatively to frame 7 by a pair of brackets 19, but in the present instance, the rear portion of the bed is extended and curved downwardly beneath the bed so as to constitute an apron 20. The end of the apron is curled inwardly at 21 and secured to the transverse rod 22. Otherwise, the contour of the apron as respects the shape of receptacle 6 is convergent from its outer end towards lip 23 of the receptacle.

Passing over roll 15, bed 18, and apron 20, is a conveyor 24, shown in the present instance, as being constructed of fine mesh screen or other like reticulated material, which will pick up seeds 25 in receptacle 6 and carry them to bed 18.

Referring to Fig. 2, as conveyor belt 24 traverses the under surface of apron 20, the pressure of the inner surface of the belt hugs the apron and permits seeds 25 to be drawn into the interstices of the conveyor and thus it carries the seeds to the upper surface of bed 18.

Guide roll 11 is mounted on the ends of bars 26, and rod 22 is carried by like bars 27. Both pairs of bars may be adjusted, respectively, by wing nuts 28—29, for controlling the amount of seed to be picked up by conveyor 24, and carried to the upper surface of bed 18.

Dough, in any desired form, is fed to belt 8 at the point just above drive roll 9. The fact that the belt is saturated with water contained in receptacle 5, moistens the bottoms of the dough forms as they are carried over bed 12 on to screen 24. The moist dough thus causes the seeds held in the interstices of the screen to free themselves and to adhere to the dough forms, which are then transferred to a baking oven.

I claim:

1. An apparatus for moistening dough forms and applying seeds thereto including a pair of receptacles, one for holding liquids and one for holding seeds, said receptacles disposed in close proximity to each other and supported by a common, horizontally disposed frame, the first mentioned receptacle having a horizontally positioned bed and an endless conveyor trained over a drive and a guide roll mounted on said frame and a guide roll suspended in the receptacle from the frame and arranged for travel in the receptacle, and along the frame over the bed, and a second mentioned receptacle also having a bed positioned horizontally in the same plane as the first mentioned bed, said bed at its inward feed end extending downwardly into the receptacle, and a drive roll mounted on the frame, an endless screen conveyor arranged for travel around the bed and drive roll and having interstices therein sufficiently large to admit seeds therein, the first mentioned conveyor for moistening the bottoms of dough forms carried on the horizontal travel thereof over the first mentioned bed, the second mentioned conveyor for carrying seeds in the interstices thereof, for adherence to the bottoms of the moistened dough forms and means for driving the endless conveyors.

2. An apparatus for moistening dough forms and applying edible units thereto including a pair of spaced receptacles, one for holding liquids and one for holding edible units, said receptacles disposed in close proximity to each other and supported by a common, horizontally disposed frame, the first mentioned receptacle having a horizontally positioned bed superposed thereabove and an endless conveyor trained over a drive and a guide roll mounted on said frame and a guide roll suspended in the receptacle and arranged for travel in the receptacle and along the frame over the bed, and the second mentioned receptacle also having a bed positioned horizontally in the same plane as the first mentioned bed, said bed at its inward feed end extending downwardly into the receptacle and forming an apron, and a drive roll mounted on said frame, an endless screen conveyor arranged for travel around the bed, depending apron and drive roll and having interstices to admit edible units, the first mentioned conveyor for moistening the bottoms of dough forms carried on the horizontal travel thereof over the first mentioned bed, the second conveyor for carrying edible units from the second mentioned receptacle, for adherence to the bottoms of the moistened dough forms carried on the horizontal travel of said conveyor, and means for driving the endless conveyors.

CHARLES HETTINGER.

References Cited in the file of this patent

UNITED STATES PATENTS

| Number | Name | Date |
|---|---|---|
| 858,542 | Rummel et al. | July 2, 1907 |
| 1,166,240 | Momenee | Dec. 28, 1915 |
| 1,603,278 | Gooch | Oct. 19, 1926 |
| 2,115,969 | Truesdell | May 3, 1938 |
| 2,347,164 | Petrilli | Apr. 18, 1944 |
| 2,365,349 | MacManus | Dec. 19, 1944 |
| 2,424,949 | White | July 29, 1947 |
| 2,451,096 | Kooman | Oct. 12, 1948 |